United States Patent [19]

Alkofer

[11] Patent Number: 4,654,722

[45] Date of Patent: Mar. 31, 1987

[54] TONE VALUE SAMPLE SELECTION IN DIGITAL IMAGE PROCESSING METHOD EMPLOYING HISTOGRAM NORMALIZATION

[75] Inventor: James S. Alkofer, Hamlin, N.Y.

[73] Assignee: Eastman Kodak Company, Rochester, N.Y.

[21] Appl. No.: 730,630

[22] Filed: May 6, 1985

[51] Int. Cl.⁴ .................. H04N 1/40; H04N 1/46; G03F 3/08; G03B 27/80
[52] U.S. Cl. .................. 358/284; 358/75; 358/80; 358/280; 355/38
[58] Field of Search .............. 358/75, 76, 78, 80, 358/280, 283, 284, 256; 382/18; 355/38, 35, 40, 41, 77, 88; 385/68

[56] References Cited

U.S. PATENT DOCUMENTS

| 4,410,909 | 10/1983 | Ueda et al. | 358/78 |
| 4,467,364 | 8/1984 | Konagaya | 358/76 |
| 4,472,736 | 9/1984 | Ushio et al. | 358/75 |

FOREIGN PATENT DOCUMENTS 297976 3/1971 U.S.S.R. .

OTHER PUBLICATIONS

"A New Approach to Programming in Photomechanical Reproduction," Yu. Ovchinnikov et al, W. Banks IPC Science and Technology Press, Guildford, England, 1974, pp. 160–163.

*Primary Examiner*—James J. Groody
*Assistant Examiner*—Randall S. Svihla
*Attorney, Agent, or Firm*—Thomas H. Close

[57] ABSTRACT

A problem in digital image processing is to automatically generate a tone reproduction function that maximizes the quality of the processed image. In an improved method for generating the tone reproduction function by normalizing the histogram of a sample of tone values, the sample of tone values is selected from an image dependent "floating" contrast interval using the statistical parameters of the distribution of tone values in the sample itself for the selection criteria. A plurality of histograms are formed from the tone values in a plurality of contrast intervals, and the most nearly normal histogram is selected for normalization.

20 Claims, 11 Drawing Figures

TONE VALUE SAMPLE SELECTION IN DIGITAL IMAGE PROCESSING METHOD EMPLOYING HISTOGRAM NORMALIZATION

TECHNICAL FIELD

The invention relates to digital image processing wherein a tone reproduction function is automatically generated by normalizing the histogram of a sample of tone values from the digital image. More particularly, the invention relates to the method of selecting the sample of tone values from the image.

BACKGROUND ART

In the field of digital image processing, an original image, such as a photographic negative, is sampled periodically to produce a digital representation of the original image. The digital image is processed by applying image processing functions to improve such image qualities as sharpness and tone scale. The processed digital image is then displayed on output media such as a CRT or photographic film or paper.

FIG. 2 is a schematic diagram of a representative apparatus employing digital image processing. Such apparatus includes an input device 10 for sampling the original image and an analog-to-digital converter 12 for producing the digital representation of the original image. Commonly employed input devices include drum and flat bed scanners, linear and area solid state image sensing arrays, and CRT and laser flying spot scanners.

The digital image is stored in a mass memory 14, such as a solid state frame buffer, magnetic tape, or disc storage device. A digital computer 16 applies the various image processing functions to the digital image to produce the processed digital image.

The digital computer 16 may comprise, for example, a main frame general purpose digital computer, or for higher speed operation, a digital computer specially configured for high speed digital processing of images.

The processed digital image is converted to sampled analog form by a digital-to-analog converter 18. The processed digital image is displayed on an output device 20 such as a drum or flat bed graphic arts scanner, or a CRT or laser flying spot scanner. The elements of the image reproduction apparatus communicate via a data and control bus 22. As noted above, one of the processing functions performed by the digital computer is to adjust the tone scale of the processed image. There is a continuing effort in the field of digital image processing to automatically determine the optimum tone reproduction function employed by the digital computer.

The basic method of tone reproduction in digital image processing is shown graphically in FIG. 3. As shown in the upper left quadrant of the graph in FIG. 3, each input signal level (measured by the input device 10 in FIG. 1) is translated to an input tone value by an input calibration function, represented by the curve labeled 24. Each input tone value is converted to an output tone value by the tone reproduction function shown as the curve labeled 26 in the upper right quadrant of the graph. Finally, each output tone value is converted to an output device level by an output calibration function shown by the curve labeled 28 in the lower right quadrant of the graph.

The input and output calibration functions are determined by the physical characteristics of the input and output devices and the input and output media. The optimum tone reproduction function, on the other hand, depends upon the tonal characteristics of the original image, and preferably is custom tailored for each image that is reproduced. Investigators have searched for a scene invariant parameter that could be used to define an optimum tone reproduction function.

This effort led some investigators to hypothesize that the highly modulated (busy) parts of a high quality image follow a normal (Gaussian) frequency distribution with respect to tone values. See for example U.S.S.R. Inventor's Certificate No. 297976 (1971) entitled "Process for the Evaluation of the Image Quality" by Ovchinnikov et al. Ovchinnikov and his coworkers went on to demonstrate that the appearance of digitally processed photographic images could be improved by using a tone reproduction function that is generated by normalizing the distribution of a statistical sample of tone values (a lightness scale was employed) taken from parts of the image where the first derivative of lightness with respect to distance in the image was greater than some predetermined minimum threshold. See the article entitled "A New Approach to Programming in Photomechanical Reproduction" by Yu. Ovchinnikov et al. The 12th IARIGAI Conference Proc., Versailles, France, Ed. W. Banks, IPC Science and Technology Press, Guildford, England 1974, pp. 160–163.

Briefly, the method of Ovchinnikov et al. involves scanning the original image and randomly sampling the tone values (lightness) occuring in parts of the image where the first derivative of lightness is above some predetermined minimum threshold value. These sampled tone values are compiled in a histogram, illustrated by the curve labeled 30 in the lower right quadrant of FIG. 4. A normal distribution is shown as the curve labeled 32 in the upper left quadrant of FIG. 4. The method for generating the tone reproduction function involves constructing a function that transforms the sampled tone value distribution into the normal distribution. The optimum tone reproduction function for the whole image is then taken as that function. This tone reproduction function is shown as the curve labeled 34 in the upper right hand corner of FIG. 4. In this prior art method, the tone reproduction function relates each lightness value in the input to an output lightness value.

After the tone reproduction function is generated, it is applied to each tone value of the digital image to produce the processed digital image.

Although the digital image processing method proposed by Ovchinnikov et al. lends itself to substantial automation in a digital computer, there are times when the method will fail to produce optimum results. For example, when a scene contains a multitude of specular reflections (from waves on water for instance) the statistical sampling process will accumulate many samples from the edges of the specular reflections, causing the resulting tone reproduction function to be undesirably distorted.

The object of the present invention is to provide a digital image processing method employing a tone reproduction function generated by normalizing the distribution of a sample of tone values selected from the informational part of the image that is less affected by the problem noted above.

DISCLOSURE OF THE INVENTION

The problem noted above is overcome by selecting the sample of tone values from an image dependent contrast interval determined by the steps of: regularly sampling the tone and contrast values of the image; compiling a plurality of tone value histograms from a corresponding plurality of contrast intervals; measuring the statistical parameters of the tone value histograms; and selecting the contrast interval having a histogram meeting predetermined statistical criteria; and using the tone values from the selected contrast interval for normalization. One preferred criterion for selection of the histogram is the normality of the selected histogram. This criterion is based upon the assumption that the most nearly normal histogram is the one least likely to have been distorted by non-random sampling.

In an embodiment of the method, the contrast values are measured by applying a Laplacian operator to the tone values generated by scanning the image. The width of the contrast intervals are chosen to be a function of the minimum visual log contrast threshold. The preselected statistical criteria on which the contrast interval is selected preferably involves the first four statistical moments of the distribution of tone values in the contrast interval.

In an embodiment where the original image is on photographic film having a grain characteristic, the image is sampled at full system resolution, and the tone values are block averaged prior to generation of the tone reproduction function to reduce the effects of grain and other system noise on the sampling process.

As a further refinement of the method, the total number of tone values in each contrast interval is counted, and only contrast intervals having a number of values greater than some minimum number are used to generate the tone reproduction function.

BRIEF DESCRIPTION OF THE DRAWINGS

The inventions are described with reference to the drawings, wherein.

MODES OF CARRYING OUT THE INVENTION

Figure 1:
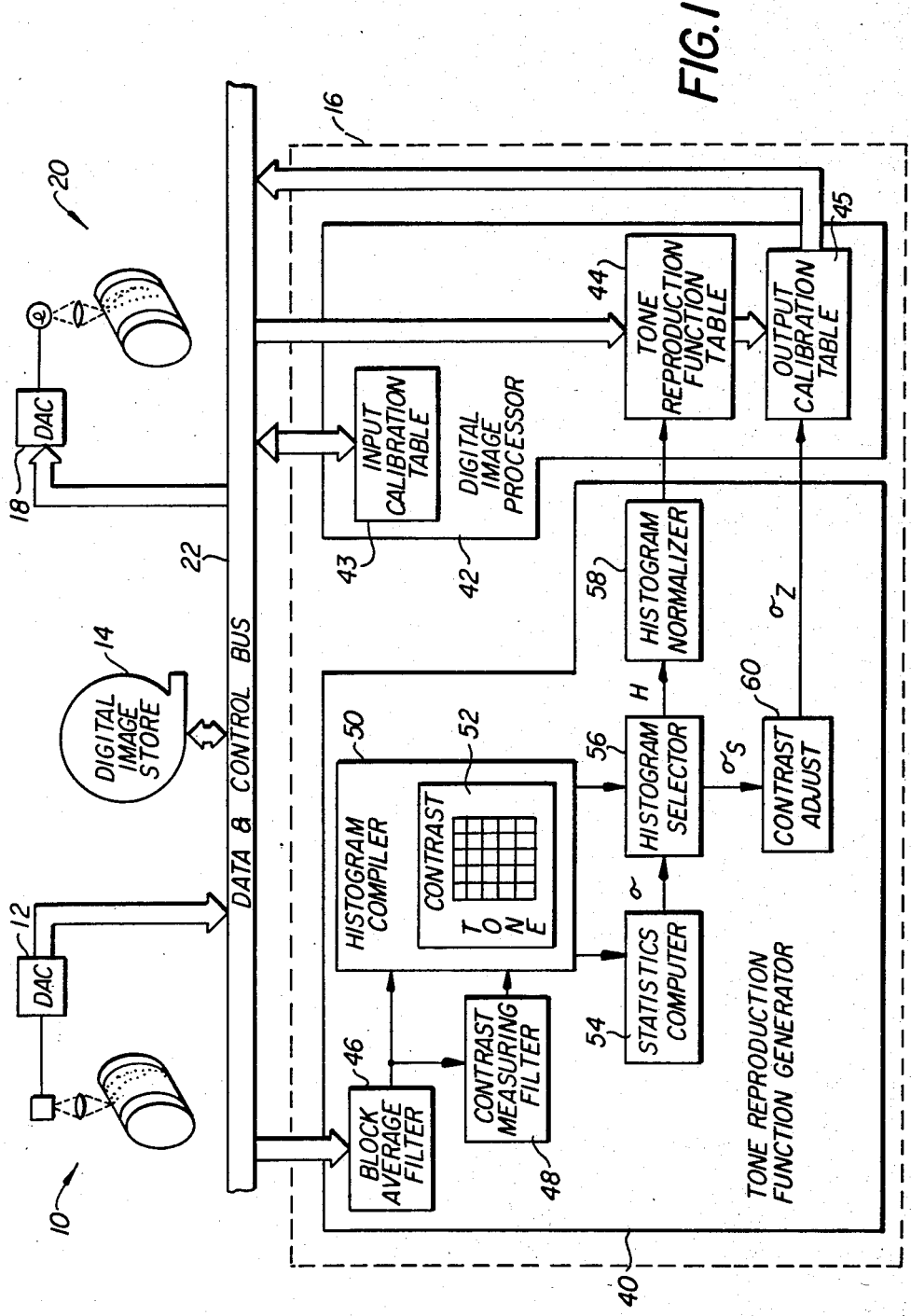
FIG. 1 is a schematic diagram illustrating apparatus for carrying out the digital image processing method according to the present invention.

Before describing the steps of the digital image processing method according to the present invention, some theoretical motivation for the invention will be discussed. As noted above, the prior art digital image processing method developed by Ovichinnikov et al. was based on the empirical observation that high quality images exhibited a normal distribution of tone values (in this case lightness) in the informational part of the image (i.e. in the edges). It was reasoned therefore, that high quality reproductions could be made by processing the image with a tone reproduction function derived by normalizing a random sample of tone values taken from the informational part of the original image.

A theoretical argument for the normal distribution of tone values in the informational portion of an image can be made based on the Central Limit Theorem. The Theorem can be paraphrased by stating that if several independent variables having values reasonably concentrated around some mean value are randomly sampled, the distribution of their sum results in a sample that will approach a normal distribution, regardless of the actual shapes of the underlying individual distributions represented by the independent variables.

When the original image is a photographic image of a real scene, there are at least four independent variables contributing to the density of the film at any point. Among these variables are; the scene log irradiance, the log reflectances of objects in the scene, the angles of the surfaces of objects in the scene with respect to the camera (affecting angle-related reflection properties), and the off-axis angle of image points in the scene with respect to the optical axis of the camera. These contributions are additive in log space, therefore it makes physical sense to apply the Central Limit Theorem.

Thus, there appears to be a sufficient number of independent variables to expect, at least in theory, a nearly normal distribution of randomly sampled tone values. Unfortunately, there are a number of factors that militate against accomplishing a truly random sample.

One important consideration in sampling the original image is to avoid sampling large uniform areas, and areas with gentle tone gradients, since sampling such areas destroys the randomness of the samples. Here a random number generator or a mask used to determine where a sample will be taken is of no help, since the number of samples taken would then be proportional to the size of an object having a uniform tone. Sampling only at edges (high contrast) tends to avoid this problem. However there are reasons why using only a lower contrast threshold, as was done in the prior art, for selecting tone values still occasionally fails to produce the desired randomness in the sample.

Consider, for example, the scene containing a multitude of specular reflections, e.g. waves on water. The high contrast edges of these specular reflections will pass the contrast threshold and as a result, the distribution of tone values will be skewed toward higher densities, causing the tone reproduction function generated from the samples to be distorted. The image reproduced using such a distorted tone reproduction function will appear too dark.

This problem is overcome by selecting tone values from a contrast interval between upper and lower contrast thresholds. The width of the contrast interval defined by these upper and lower contrast thresholds is made small enough so that the randomness of the sample is insured, yet large enough so that the sample is statistically significant. Further, to improve the randomness of the sample, the location of the narrow contrast interval "floats", i.e. its location is determined for each image by examining the statistics of the histogram of tone values in a plurality of contrast intervals. One preferred criterion for selecting a histogram from one of the contrast intervals is the normality of the histogram, based on the assumption that the most nearly normal distribution is the one that was least likely to have been distorted by non-random sampling. The histogram meeting the desired statistical criteria is chosen for normalization.

Figure 2:
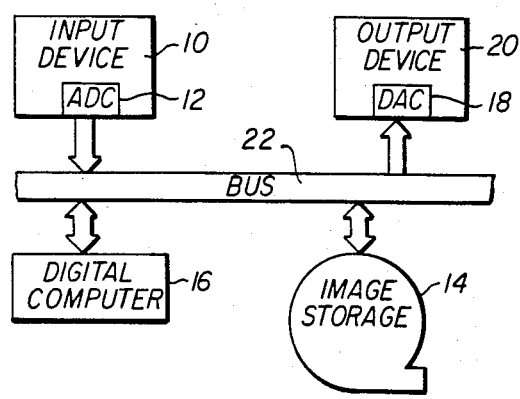
FIG. 2 is a schematic diagram of generic prior art image reproduction apparatus employing digital image processing.
Figure 3:
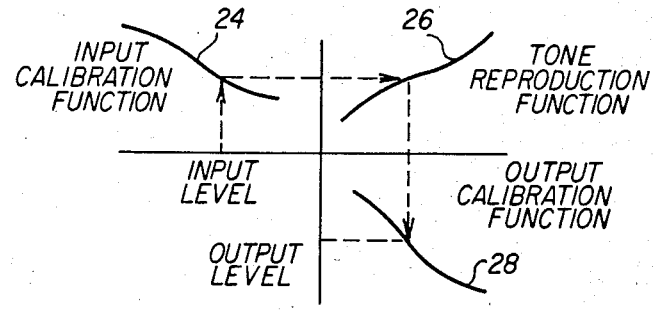
FIG. 3 is a graph illustrating the prior art method of tone reproduction in digital image processing employing a tone reproduction function.
Figure 4:
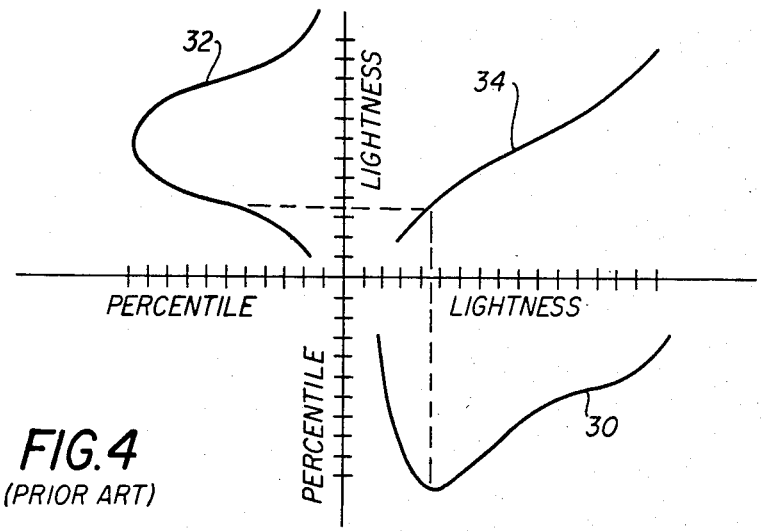
FIG. 4 is a graph illustrating the prior art method of generating the tone reproduction function by normalizing a sample of tone values.

Turning now to FIG. 1, an example of apparatus used to practice the present invention will be described. Elements similar to those in FIG. 2 are similarly numbered. The input device 10 is a graphic arts scanner, shown as a drum-type scanner. A scanning spot size of 12 μm sampled on approximately 8 μm centers was employed to scan photographic negatives as the original input image. The signal produced by this scanner is supplied to an analog-to-digital converter 12 that produces an 8-bit output code representing one of 256 possible signal levels for each sample point. The sampled signal levels are transformed to photographic density units by a digital computer 16 and are then stored on a magnetic tape storage device 14.

The digital image is processed by the digital computer 16. A DEC 2060 mainframe computer was used. The processed digital images are converted from digital to analog form by a digital-to-analog converter 18. The processed image is reproduced on an output scanning device 20, shown as a graphic arts drum-type scanner having a light source that is modulated by the sampled analog signal. The transfer of digital image signals and control signal between the elements of the apparatus is handled by a data and control bus 22.

The digital computer 16 is programmed to provide a tone reproduction function generator 40 and a digital image processor 42. The tone reproduction function generator 40 receives the digital image from the digital image storage device 14 and generates a tone reproduction function. The tone reproduction function is supplied to a tone reproduction function table 44 in the digital image processor 42. The tone reproduction function generator 40 also produces a multiplicative constant $\sigma_z$ for adjusting contrast as described below. The constant is factored into an output calibration table 45 in the digital image processor 42. Alternatively, the multiplicative constant can be factored into the tone reproduction function table 44. The digital image processor 42 also includes an input calibration table 43 that transforms the scanner signal levels to photographic density units.

Figures 5, 6:
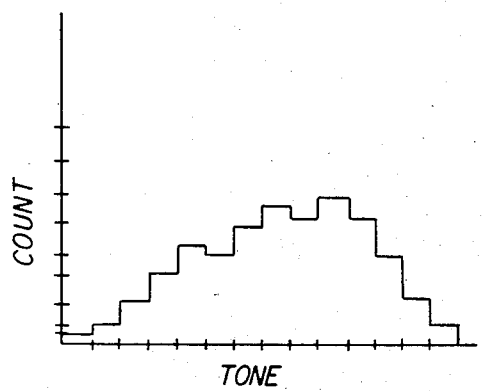
FIG. 5 illustrates the arrangement of the histogram memory employed to compile the histogram of tone values.
FIG. 6 is a graph illustrating a tone value histogram from one of the contrast intervals shown in FIG. 5.

The tone reproduction function generator 40 includes a filter 46 for performing a block average on the digital image, and a filter 48 for measuring the contrast of the image around each block averaged tone value. A histogram compiler 50 compiles the block averaged tone values into a plurality of histograms from a plurality of contrast intervals in a histogram memory 52. FIG. 5 shows, in a graphic way, the organization of the histogram memory 52. There are twenty contrast intervals having a width of 0.04 log contrast units each. The width of the contrast intervals was chosen as a function of (approximately twice) the minimum visual log contrast threshold. The width of the contrast interval represents a tradeoff between randomness of sampling (the narrower the interval, the greater the randomness) and achieving a statistically significant sample (the wider the interval, the more samples in the interval). The 256 possible tone values are divided into 80 tone bins, for a resolution of 0.05 density units per tone bin.

Counts are accumulated in the appropriate tone bins in the histogram memory until all of the tone values in the digital image have been counted. FIG. 6 shows a graphic example of one of the tone value histograms from one of the contrast intervals.

Returning to FIG. 1, a statistics computer 54 in the tone reproduction function generator 40 computes the statistical parameters of the histograms of tone values in the constant intervals in the histogram memory 52.

A histogram selector 56 selects a histogram from one of the contrast intervals on the basis of predetermined statistical criteria relating to the histogram of tone values in the interval, and supplies the selected histogram to a histogram normalizer 58. The histogram normalizer 58 normalizes the selected histogram to generate the tone reproduction function used to form the tone reproduction function lookup table 44.

A contrast adjustment computer 60 receives the standard deviation $\sigma_s$ of the tone values in the selected contrast interval and generates a multiplicative constant $\sigma_z$ used to determine the contrast of the processed image. The method of contrast adjustment is the subject of copending U.S. patent application Ser. No. 730,629. The multiplicative constant is factored into output calibration table 45.

The tone reproduction function lookup table 44 relates each of the 256 possible input values to one of 256 possible output values. After the tone reproduction function lookup table 44 has been generated, the digital image processor 42 processes the digital image by applying the tone reproduction function to each tone value in the image to produce a processed digital image. The output device calibration function is then applied to the processed digital image. The processed digital image is converted to analog form by digital-to-analog converter 18. The processed analog signal is then applied to the output scanning device 20 to reproduce the image.

The method of generating the tone reproduction function will now be described in more detail with reference to the flow charts of FIGS. 7-10.

Figure 7:
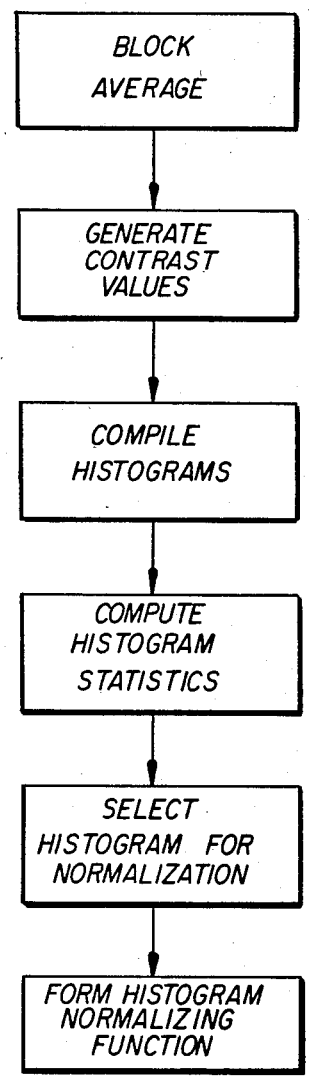
FIGS. 7–10 are flow charts illustrating the method of generating a tone reproduction function according to the invention.

Referring first to the flow chart of FIG. 7, the steps performed on the digital image to generate the tone reproduction function include forming a block average of the digital image. This is accomplished by applying a digital filter to the digital image tone values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} /16 \tag{1}$$

which means that the tone values of the image are averaged in nonoverlapping blocks of sixteen. This step is performed by the block average filter 46 in FIG. 1. Block averaging is performed to remove the effects of film grain on the tone value statistics and reduces the noise by a factor of 4.

Next, a digital filter representing a Laplacian operator of the form:

$$\begin{bmatrix} 0 & -1 & 0 \\ -1 & 4 & -1 \\ 0 & -1 & 0 \end{bmatrix} \tag{2}$$

is applied to the block averaged digital image to measure the contrast of the image at each block averaged tone value. This step is performed by the contrast measuring filter 48 in FIG. 1. The Laplacian operator has no response to uniform areas or linear gradients, and responds only to changes in gradients. The Laplacian operator works well in measuring the contrast of the image. However, it is to be understood that other contrast measuring filter (e.g. gradient filters) may be employed with the present invention to measure the contrast of the image.

The histograms are compiled by histogram compiler 50 as discussed above, their statistics computed by statistics computer 54, and a histogram is selected for normalization by histogram selector 56. The selected histogram is normalized to generate the tone reproduction function by histogram normalizer 58.

Figure 8:
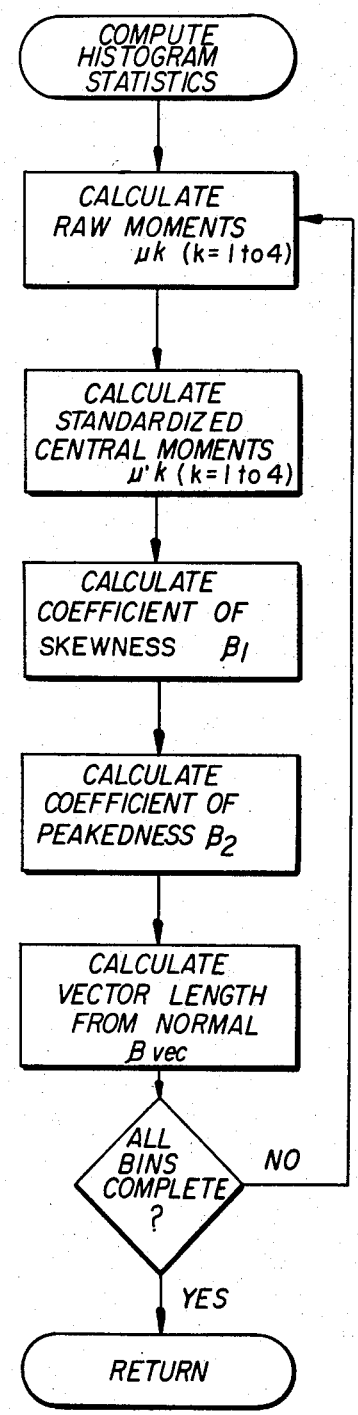

FIG. 8 is a flow chart showing the steps involved in compiling the histogram statistics. The raw moments $\mu_k$ taken about the mean, are computed as follows:

$$\mu_k = \frac{1}{N}\left(\sum_{i=1}^{N}(x_i - \bar{x})^k\right) \quad (3)$$

where
N is total number of samples;
$x_i$ is a tone value; and
$\bar{x}$ is the mean tone value.

The standardized central moments $\mu'_k$ are calculated as follows:

$$\mu'_k = \frac{\mu_k}{\sigma^k},$$

where $$\sigma = \sqrt{\mu_2} \quad (4)$$

The coefficient of symmetry (skewness) for each distribution is then represented as the square of the third standardized central moment $$\beta_1 = (\mu'_3)^2 \quad (5)$$

and the coefficient of peakedness (kurtosis plus 3) is represented as the fourth standardized central moment $$\beta_2 = \mu'_4 \quad (6)$$

The vector length in the $\beta_1$, $\beta_2$ plane from the normal or Gaussian distribution of each histogram is then assigned a value $\beta_{vec}$ calculated as follows:

$$\beta_{vec} = \sqrt{\beta_1^2 + (\beta_2 - 3)^2} \quad (7)$$

Figures 9, 10:
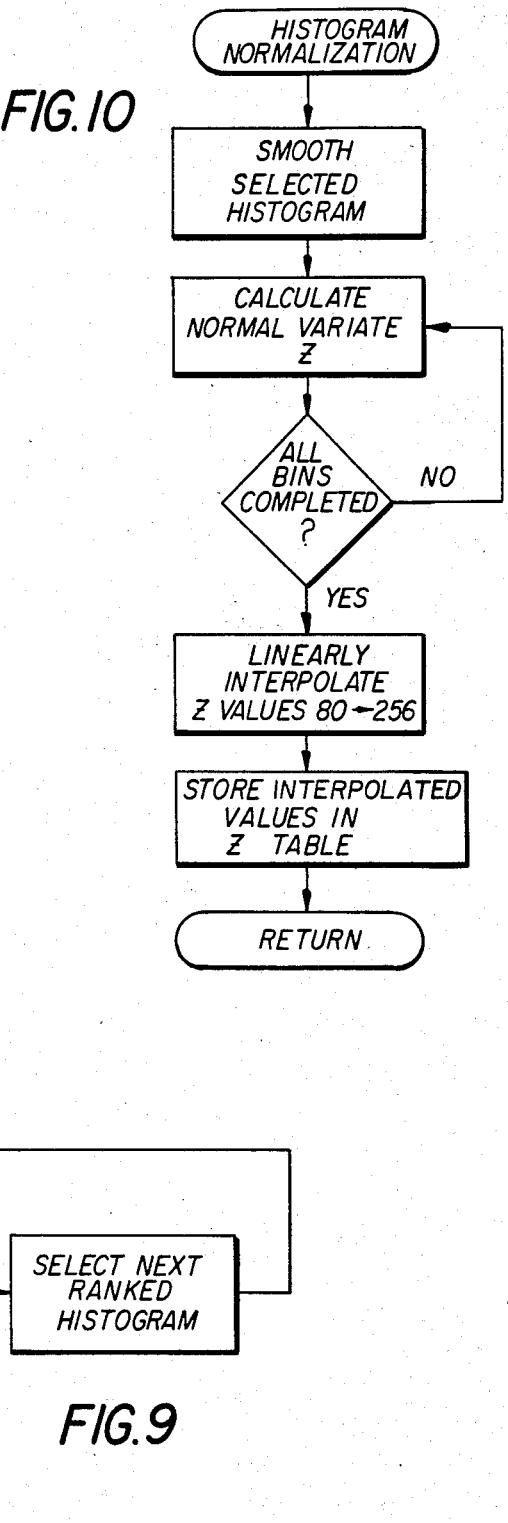

Referring now to FIG. 9, the steps involved in selecting the histogram for normalization will be discussed. When the statistics for all of the histograms have been computed, the histograms are ranked according to their vector distance $\beta_{vec}$ from a normal distribution. The histogram having the lowest value of $\beta_{vec}$ is ranked first, and the histogram having the highest value is ranked last. The histogram chosen for normalization is the one ranked first, since this is the histogram that is least likely to have been distorted by noise. Other criteria involving the first four moments of the histograms in the contrast intervals may also be used for selecting the histogram to be normalized. For example, in an application to color image processing as, described in copending U.S. patent application Ser. No. 730,627, the similarity of shape of the histograms of different colors in a contrast interval is employed as a criterion for selection.

Optionally, to insure that there is a statistically significant number of samples in the histogram, a check on the total count of samples in the histogram is performed. If the total count is less than some predetermined number, say 1000 samples, the next lower ranked histogram is checked for number of samples. This check is continued until a histogram having at least the required minimum number of samples is chosen.

Turning now to FIG. 10, the steps involved in normalizing the selected histogram to form the tone reproduction function will be described. When a histogram has been selected for normalization, the standard normal variate Z for all 80 tone bins in the selected histogram is computed. The term standard normal variate as used herein refers to a value on a scale in units of standard deviations of a normal (Gaussian) distribution having a standard deviation of one and a mean of zero.

First however, an average smoothing operation is performed on the selected histogram to remove any spikes. The smoothing is performed on 3 consecutive tone bins as follows:

$$h_i = \tfrac{1}{3}(h'_{i-1} + h'_i + h'_{i+1}) \quad (8)$$

where
$h'_i$ is the count in bin i and
$h_i$ is the smoothed value.

Next, the standard normal variate Z is calculated for the smoothed values of the histogram as follows (from *Approximations for Digital Computers*, Hastings C., Princeton Univ. Press.):

$$Z_j = t_j - \frac{a_0 + a_1 t_j}{1 + b_1 t_j + b_2 t_j^2} \quad (9)$$

where
$t_j = \sqrt{\ln(1/P_j^2)}$,
$a_0 = 2.30753$,
$a_1 = 0.27061$,
$b_1 = 0.99229$,
$b_2 = 0.04881$.

The probability $P_j$ for each of the 80 bins is given by $$P_j = \frac{\sum_{i=1}^{j} h_i}{\sum_{i=1}^{80} h_i} \quad (10)$$

where
$h_i$ are the smoothed counts in the ith tone bin, and
$j = 1$ to 80.

Next, the Z values are linearly interpolated from 80 to 256 values to provide a Z value for each of the 256 possible scanner inputs represented by the 8-bit digital code. Finally the 256 Z values are stored in the tone reproduction function lookup table 44.

Figure 11:
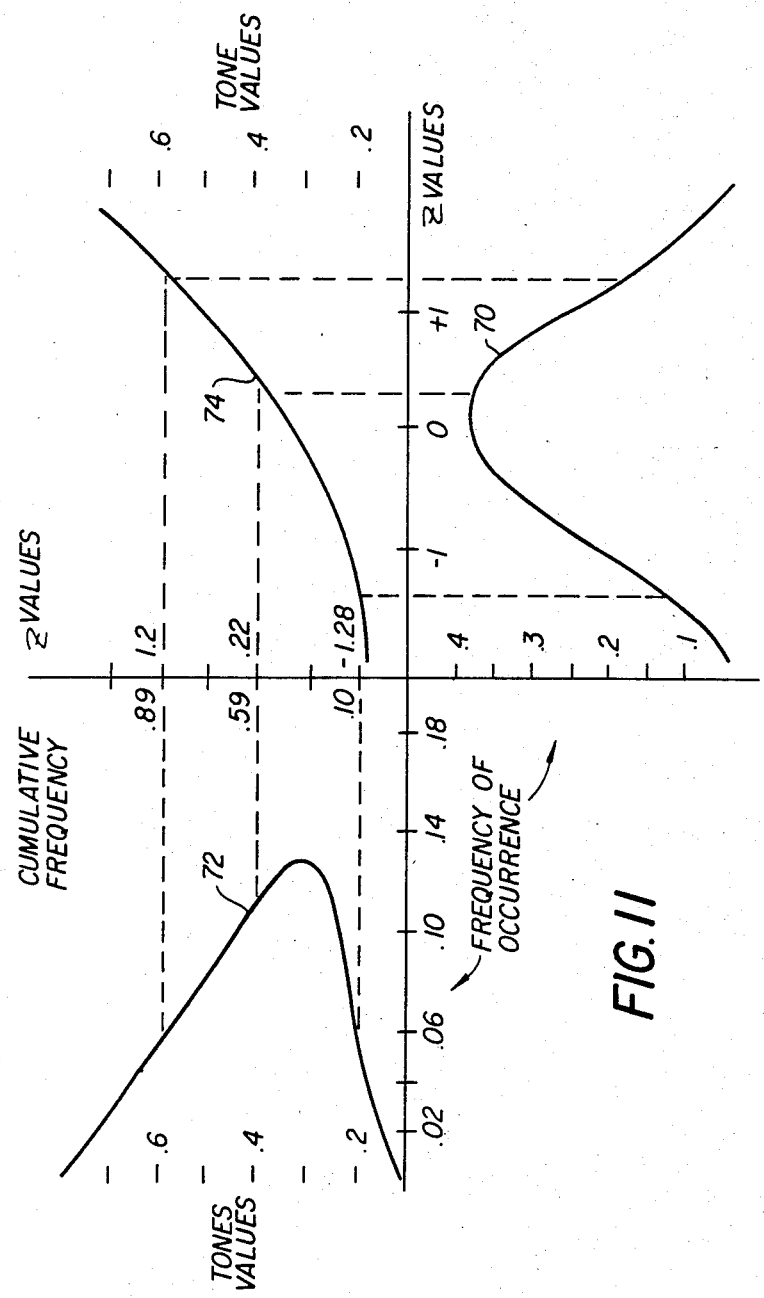
FIG. 11 is a graph illustrating the form of the tone reproduction function generated according to the steps outlined in FIG. 10.

FIG. 11 is a graph showing the form of the tone reproduction function produced according to the steps outlined above. In the lower right quadrant of the graph, a curve labeled 70 represents a standard normal distribution showing the probability of the occurrence of a value plotted against the standard normal variate Z. In the upper left quadrant of the graph, the curve labeled 72 represents the sample of tone values from the informational portion of the image, plotted against relative probability of occurrence. The central ordinate of the graph relates the relative probability $P_j$ of the tone value sample distribution to Z values according to the relationship defined by equation (9). The tone reproduction curve, labeled 74, maps the Z values on the ordinate to the same Z values on the abcissa. A tone value scale on the far upper right of the diagram, congruent to the tone value scale on the far left, shows how the tone reproduction function relates tone values to Z values.

After the tone reproduction function lookup table is generated, all of the tone values of the image are processed by applying the tone reproduction function to them. At this point, the processed tone values from the image are dimensionless quantities representing the Z values.

To recover the processed image, these dimensionless quantities are given magnitudes with respect to both the original scene and the output medium by multiplying the values with a multiplier $\sigma_z$ that adjusts the contrast of the processed image, and adding a constant term which relates the adjusted Z values to the density of the output medium. The method of generating the tone reproduction function in terms of Z values, and adjusting the contrast is the subject of copending U.S. patent application Ser. No. 730,629. These factors are incorporated in the output calibration table 45 shown in FIG. 1. The processed digital image is then displayed. Alternatively, the Z values in the tone reproduction function table may themselves be adjusted by multiplying with the contrast adjustment constant and adding the scaling constant.

Appropriate values for the constant multiplier $\sigma_z$ and the additive constant are determined as follows. The intrinsic contrast of natural scenes can be quantified in terms of the standard deviation of log reflectance of edges in the scene or the density representation of those log reflectances in the photographic image. On the average the approximate relationship between the two is given by:

$$\sigma_D = \overline{G} \cdot \sigma_R \quad (11)$$

where
$\overline{G}$ = average gradient of the photographic film (relates $\sigma_R$ to some specific reproduction medium contrast)
$\sigma_R$ = standard deviation of log reflectance based on a large number of original scenes
$\sigma_D$ = standard deviation of density.

Typical values for $\sigma_R$ and $\overline{G}$ are 0.31 and 1.00 respectively for black and white photographic negative materials, such that $\sigma_D$ is 0.31. Departures from this average contrast must be compensated. A general equation may be stated as:

$$\sigma_z = m \cdot f(\sigma_s) + b \quad (12)$$

where:
$\sigma_s$ = individual scene standard deviation, from the selected contrast interval
m and b are system dependent constants and
$f(\sigma_s)$ is some function of the sample standard deviation
$\sigma_z$ = the multiplier applied to the values obtained from the tone reproduction function.

A simple and satisfactory implementation is obtained from:

$$b = \sigma_D(1.0 - m) \quad (13)$$

$$\sigma_z = m \cdot \sigma_s + b \quad (14)$$

where m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

Note that the adjustment of the contrast in (14) does not affect scenes having the average contrast ($\sigma_D$), nor does it affect the mean value of tone in the scene, since in terms of Z (the standard normal variate) the average value remains 0.0. This is not only a computational convenience in terms of adjusting the contrast, but also in "calibrating" the transformed image with respect to the reproduction medium. For example, if a negative image is to be printed directly onto photographic paper, the log exposure for the desired mean paper density is added to the translated, contrast adjusted values. The complete calculation is given by:

$$\log E_{ZD} = -\sigma_T Z_D + \log E_A \quad (15)$$

where:
$\log E_A$ = log exposure required to obtain the aim paper density
$Z_D$ = translated Z value for some input density in the original image
$\log E_{ZD}$ = log exposure for $Z_D$.

Industrial Applicability and Advantages

The digital image reproduction method according to the present invention is useful in the graphic arts and photographic printing fields to provide automatic tone-scale adjustment of digitally processed images. The method is advantageous in that a greater percentage of aesthetically pleasing images are produced automatically, without the need for operator intervention, than by the methods of the prior art. By selecting the tone values from an image dependent "floating" contrast interval, and by basing the selection on the statistical properties of the sample of tone values in the contrast interval, the effects of highly modulated portions of a scene not representing image information, such as waves on water, are avoided.

I claim:
1. A method for processing a digital image having tone values, the method employing a tone reproduction function generated by normalizing a histogram of a sample of tone values selected from the digital image, characterized by said sample of tone values being selected from an image-dependent contrast interval determined by the steps of:
   (1) regularly sampling tone values from the digital image;
   (2) compiling the sampled tone values into a plurality of samples of tone values corresponding to a plurality of contrast intervals and forming histograms of the samples of tone values;
   (3) calculating statistical parameters of the tone value histograms;
   (4) selecting one of the histograms on the basis of predetermined statistical criteria; and
   (5) normalizing the selected histogram to generate the tone reproduction function.

2. The method claimed in claim 1, wherein said predetermined statistical criteria relate to the normality of the histograms, with the most nearly normal histogram being selected for generating the tone reproduction function.

3. The method claimed in claim 1, wherein said contrast intervals are each twice as wide as a minimum visual log contrast threshold.

4. The method claimed in claim 1, wherein the contrast intervals are obtained by applying a two-dimensional Laplacian operator to the tone values of the digital image.

5. The method claimed in claim 4, wherein the tone values of the digital image are block averaged prior to applying the Laplacian operator.

6. The method claimed in claim 1 further including the step of counting the total number of tone values in each of said plurality of samples of tone values and using only histograms formed from those samples of tone values having greater than a predetermined minimum number of tone values in the selection step.

7. The method claimed in claim 6, wherein said predetermined minimum number is 1,000 tone values.

8. Apparatus for processing a digital image having tone values including means for generating a tone reproduction function by normalizing a histogram of a sample of tone values selected from the digital image and means for applying said tone reproduction function to tone values of the digital image, wherein said means for generating the tone reproduction function includes:
   (1) means for regularly sampling the tone values of the digital image;
   (2) means for forming a plurality of tone value histograms from a corresponding plurality of samples of tone values corresponding to a plurality of contrast intervals;
   (3) means for calculating statistical parameters of the tone value histograms; and
   (4) means for selecting one of the tone value histograms on the basis of predetermined statistical criteria, the selected histogram being normalized to generate the tone reproduction function.

9. The apparatus claimed in claim 8, wherein said predetermined statistical criteria relate to the normality of the histograms, with the most nearly normal histogram being selected by said selecting means.

10. The apparatus claimed in claim 8, wherein said contrast intervals each have a width that is a function of a minimum visual log contrast threshold.

11. The apparatus claimed in claim 8, wherein said means for regularly sampling tone values of said digital image comprises means for applying a two-dimensional Laplacian operator to the tone values of the digital image.

12. The apparatus claimed in claim 11, wherein said means for regularly sampling tone values further comprises means for applying a block average digital filter to the tone values of the digital image.

13. The apparatus claimed in claim 8, further including means for counting the total number of tone values in each of said plurality of samples of tone values, and for cooperating with said selecting means such that only histograms formed from those samples of tone values having greater than a predetermined minimum number of tone values can be selected for normalization.

14. The apparatus claimed in claim 13, wherein said predetermined minimum number is 1,000 tone values.

15. A method for processing a digital image having tone values employing a tone reproduction function generated by normalizing a histogram of a sample of tone values selected from the digital image, characterized by selecting said sample of tone values from an image-dependent "floating" contrast interval.

16. The method claimed in claim 15, wherein said "floating" contrast interval is selected from one of a plurality of contrast intervals each containing a plurality of tone values as a function of statistical parameters of the distribution of the tone values in the contrast intervals.

17. The method claimed in claim 16, wherein the statistical parameters are indicative of the normality of the distribution of the tone values in the contrast intervals, with the contrast interval having the most nearly normal distribution of tone values being selected.

18. A method for processing a digital image having tone values employing a tone reproducton function generated by normalizing a histogram of a sample of tone values, characterized by:
   selecting the sample of tone values from one of a plurality of contrast intervals each containing a number of tone values based upon statistical criteria involving the first four moments of the distribution of tone values in the contrast intervals.

19. The digital image processing method claimed in claim 18, wherein the statistical criteria relate to the normality of the distribution of the tone values in the contrast intervals.

20. The digital image processing method claimed in claim 19, wherein the contrast intervals are each twice as wide as a visual log contrast threshold.

* * * * *